United States Patent
Richardson et al.

(10) Patent No.: US 12,488,397 B2
(45) Date of Patent: *Dec. 2, 2025

(54) SYSTEMS AND METHODS FOR DETECTING, EXTRACTING, AND CATEGORIZING STRUCTURE DATA FROM IMAGERY

(71) Applicant: Insurance Services Office, Inc., Jersey City, NJ (US)

(72) Inventors: Ron Richardson, South Jordan, UT (US); Cory Shelton, Cedar Hills, UT (US); Corey David Reed, Cedar Hills, UT (US)

(73) Assignee: Insurance Services Office, Inc., Jersey City, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/595,784

(22) Filed: Mar. 5, 2024

(65) Prior Publication Data

US 2025/0078165 A1     Mar. 6, 2025

Related U.S. Application Data

(63) Continuation of application No. 17/339,510, filed on Jun. 4, 2021, now Pat. No. 11,922,509.

(Continued)

(51) Int. Cl.
    *G06Q 40/00*      (2023.01)
    *G06F 16/29*      (2019.01)
    (Continued)

(52) U.S. Cl.
    CPC .............. *G06Q 40/08* (2013.01); *G06F 16/29* (2019.01); *G06N 20/00* (2019.01); *G06T 7/0002* (2013.01);

(Continued)

(58) Field of Classification Search
    CPC ........ G06Q 40/08; G06F 16/29; G06N 20/00; G06T 7/0002; G06T 2200/24;
(Continued)

(56) References Cited

U.S. PATENT DOCUMENTS

| | | | |
|---|---|---|---|
| 8,489,641 B1 * | 7/2013 | Seefeld ................. | G06F 16/444 715/788 |
| 10,204,193 B2 * | 2/2019 | Koger .................... | G06F 30/13 |

(Continued)

OTHER PUBLICATIONS

LandSurf: A smart tool for evaluating properties and lands; 2017 Sensors Networks Smart and Emerging Technologies (SENSET) (pp. 1-4); John S. Massaad, Aziz M. Barbar, Anis Ismail; Sep. 1, 2017. (Year: 2017).*

(Continued)

*Primary Examiner* — Tien C Nguyen
(74) *Attorney, Agent, or Firm* — McCarter & English, LLP (57) ABSTRACT

Systems and methods for detecting, extracting, and categorizing structure data from aerial imagery following a major weather event are provided. The system processes digital images and weather data to automatically detect, extract, and categorize structure data following a major weather event. After receiving an indication of a region of interest ("ROI") from a user, the system retrieves weather mapping data for the ROI and retrieves information related to attributes of structures within the ROI from a machine learning subsystem. The system then cross-references the property data, the weather data, and the structure attributes and assigns a risk rating to the structures within the ROI. Finally, the system generates and delivers a data package to the user.

19 Claims, 10 Drawing Sheets

Related U.S. Application Data (60) Provisional application No. 63/034,670, filed on Jun. 4, 2020.

(51) Int. Cl.
  *G06N 20/00* (2019.01)
  *G06Q 40/08* (2012.01)
  *G06T 7/00* (2017.01)
  *G06V 20/10* (2022.01)

(52) U.S. Cl.
  CPC ........ *G06V 20/176* (2022.01); *G06T 2200/24* (2013.01); *G06T 2207/10032* (2013.01); *G06T 2207/20081* (2013.01); *G06T 2207/20104* (2013.01); *G06T 2207/30184* (2013.01)

(58) Field of Classification Search
  CPC . G06T 2207/10032; G06T 2207/20081; G06T 2207/20104; G06T 2207/30184; G06V 20/176; G06V 20/10; G06V 20/17
  USPC .............. 705/4, 3, 37, 38, 39; 715/788, 708; 709/26, 201, 227; 726/9, 6; 235/379, 235/380; 700/245
  See application file for complete search history.

(56) References Cited

U.S. PATENT DOCUMENTS

| | | | | |
|---|---|---|---|---|
| 10,672,081 | B1* | 6/2020 | Lyons | G06V 20/176 |
| 11,922,509 | B2 | 3/2024 | Richardson et al. | |
| 2012/0311053 | A1* | 12/2012 | Labrie | G06Q 40/08 |
| | | | | 709/206 |
| 2015/0025914 | A1* | 1/2015 | Lekas | G06V 20/176 |
| | | | | 705/4 |
| 2015/0302529 | A1* | 10/2015 | Jagannathan | G06Q 40/08 |
| | | | | 705/4 |
| 2016/0343093 | A1* | 11/2016 | Riland | G06Q 50/06 |
| 2018/0190132 | A1* | 7/2018 | Cronkhite | G08G 5/32 |
| 2018/0336418 | A1* | 11/2018 | Splittstoesser | G06F 18/22 |
| 2019/0028534 | A1* | 1/2019 | Bloomquist | G08B 31/00 |
| 2019/0236365 | A1* | 8/2019 | Speasl | G01S 17/89 |
| 2020/0098130 | A1* | 3/2020 | Porter | G06T 7/70 |
| 2020/0134573 | A1* | 4/2020 | Vickers | G06F 16/29 |
| 2021/0383481 | A1 | 12/2021 | Richardson et al. | |

OTHER PUBLICATIONS

Pairs AutoGeo: an Automated Machine Learning Framework for Massive Geospatial Data; 2020 IEEE International Conference on Big Data (Big Data) (pp. 1755-1763); Wang Zhou, Levente J. Klein, Siyuan Lu; Dec. 10, 2020. (Year: 2020).*

International Search Report of the International Searching Authority mailed on Sep. 8, 2021, issued in connection with International Application No. PCT/US2021/35938 (3 pages).

Wiritten Opinion of the International Searching Authority mailed on Sep. 8, 2021, issued in connection with International Application No. PCT/US2021/35938 (7 pages).

Office Action mailed Jul. 20, 2022, issued in connection with U.S. Appl. No. 17/339,510 (24 pages).

Arshad, et al., "Computer Vision and IoT-Based Sensors in Flood Monitoring and Mapping: A Systematic Review," Sensors (Basel, Switzerland), Nov. 16, 2019 (19 pages).

Office Action mailed May 2, 2023, issued in connection with U.S. Appl. No. 17/339,510 (28 pages).

Albrechet, et al., "Next-Generation Geospatial Temporal Information Technologies for Disaster Management," IBM Journal of Research and Development (2020) (14 pages).

Notice of Allowance mailed Nov. 13, 2023, issued in connection with U.S. Appl. No. 17/339,510 (11 pages).

Extended European Search Report dated Dec. 5, 2023, issued by the European Patent Offfice in connection with European Patent Application No. 21818668.2 (7 pages).

* cited by examiner

| | | File | Event Date ▼ | Created ▼ | Status | Actions |
|---|---|---|---|---|---|---|
| | Wind-2019-09-08 | PIF Input_1783.xlsx | 09.17.19 | 10.11.19 | Uploaded | ⋮ |
| | Wind-2019-09-08 | Bay County FL.csv | 09.07.19 | 09.26.19 | Uploaded | ⋮ |
| ⋮⋮ | TestQAHail-2019-06-07 | PIF XLSX SAMPLE - Mini.xlsx | 09.07.19 | 09.26.19 | Uploaded | ⋮ |
| | | uper Large.xlsx | 06.06.19 | 09.25.19 | Uploaded | ⋮ |
| | | 000 Large.csv | 06.06.19 | 09.23.19 | Uploaded | ⋮ |
| | | PLE - Mini.xlsx | 06.06.19 | 09.23.19 | Uploaded | ⋮ |
| | Wind-2019-08-21 | PIF XLSX SAMPLE - Mini.xlsx | 08.20.19 | 09.23.19 | Uploaded | ⋮ |
| ⋮⋮ | Hail-2019-05-13 | PIF ANH 2.xls | 05.12.19 | 09.17.19 | Uploaded | ⋮ |
| | Wind-2019-05-13 | PIF ANH 2.xls | 05.12.19 | 09.17.19 | Uploaded | ⋮ |

Geomni TRIAGE (BETA) — 120

- 122: START NEW ORDER
- 124: DASHBOARD | TRIAGE (BETA) | WEBVIEWER
- 126: Search your projects...
- 128, 132
- 130: Callout text: "The peril type, like hail or wind, is listed on the left column of each project. In the last column, three dots represent where a customer may download a CSV to review the project or open a map view of all affected properties."
- Callout: "Viewing and finding tasks is made easy with the filter button and search bar. The projects are filtered by peril date, peril type, and creation date."
- 134: Triage and WV Beta Testers
- Items per page: 10 ▼  1-10 of 27
- 134a–134g: row indicators

SYSTEMS AND METHODS FOR DETECTING, EXTRACTING, AND CATEGORIZING STRUCTURE DATA FROM IMAGERY

RELATED APPLICATIONS

This application is a continuation of, and claims priority to U.S. patent application Ser. No. 17/339,510 filed on Jun. 4, 2021, now U.S. Pat. No. 11,922,509 issued on Mar. 5, 2024, which claims the priority of U.S. Provisional Application Ser. No. 63/034,670 filed on Jun. 4, 2020, the entire disclosures of which are expressly incorporated herein by reference.

BACKGROUND

Technical Field

The present disclosure relates generally to the field of computer analysis of structures and weather events. More specifically, the present disclosure relates to systems and methods for detecting, extracting, and categorizing structure data from aerial imagery following a major weather event.

Related Art

Accurate and rapid identification of damage caused to structures by major regional weather events (e.g., hurricanes, hailstorms, tornadoes, etc.) is increasingly important for a variety of applications. For example, information related to roofs of buildings is often used by insurers and construction professionals to specify materials and associated costs for repair and/or replacement of damaged structures. Further, in the insurance industry, accurate information about structures may be used to determine the proper costs for insuring buildings/structures. Still further, government entities can use information about damage caused by previous weather events for planning projects such as zoning, construction, parks and recreation, housing projects, etc.

Various software systems have been developed to process aerial images to extract data about structures present in the aerial images. However, these systems have drawbacks, such as an inability to accurately determine the likelihood of damage caused to a structure by a weather event and the inability to easily categorize a plurality of properties within a region of interest in order to isolate specific structures requiring attention. This may result in an inaccurate or an incomplete understanding of the damage caused to various structures within the region after a major weather event. As such, the ability extract information by processing data from a major weather event and data extracted from aerial images within the same region, and then analyze said information, is a powerful tool.

Thus, what would be desirable is a system that can processes digital images and weather data to automatically detect, extract, and categorize structure data following a major weather event. Accordingly, the systems and methods disclosed herein solve these and other needs.

SUMMARY

This present disclosure relates to systems and methods for detecting, extracting, and categorizing structure data from aerial imagery following a major weather event. More specifically, the disclosed system can processes digital images and weather data to automatically detect, extract, and categorize structure data following a major weather event. After receiving an indication of a region of interest ("ROI") from a user, the system retrieves weather mapping data for the ROI and retrieves information related to attributes of structures within the ROI from a machine learning subsystem. The system then cross-references the property data, the weather data, and the structure attributes and assigns a risk rating to the structures within the ROI. Finally, the system generates and delivers a data package to the user. The data package can include a spreadsheet, or the like, that includes the weather information, aerial imagery of the ROI, attributes (e.g., roof type, area, slope, material, eave height, etc.), and a likelihood of property damage associated with each property or structure within the ROI. The data package can also include a visualization of this information.

The described system can be embodied as system code stored on a computer-readable medium and executable by a hardware processor or one or more computer systems. The code can include an aerial imagery analysis machine learning subsystem, a damage prediction subsystem, a categorization subsystem, and a damage detection subsystem and the code can communicate with an aerial imagery database and a weather database. Additionally, the code can be distributed across multiple computer systems in communication with each other over a communications network, and/or stored and executed on a cloud computing platform.

The system can also include a graphical user interface for receiving information from a user, such as a list of structures or properties within the ROI, the date of the weather event, and the light. The graphical user interface can also be used to deliver the data package to the user. For example, the graphical user interface can display a table including a list of properties within the ROI, and attributes associated with each property such as geospatial coordinates, roof size, roof shape, slope, eave height, likelihood of damage, category, and the like. The graphical user interface can also display a project map showing the ROI and allowing the user to compare property points to weather data for the date of the weather event.

BRIEF DESCRIPTION OF THE DRAWINGS

The foregoing features of the invention will be apparent from the following Detailed Description of the Invention, taken in connection with the accompanying drawings, in which.

DETAILED DESCRIPTION

The present disclosure relates to systems and methods for detecting, extracting, and categorizing structure data from imagery and determining the likelihood of potential property damage due to a major weather event (e.g., hurricane, hailstorm, and the like), as described in detail below in connection with FIGS. 1-9.

The embodiments described below are related to determining the likelihood of potential property damage after a major weather event and refer to a roof of a structure in one or more examples. It should be understood that any reference to the roof of the structure is only by way of example, and that the systems, methods and embodiments discussed throughout this disclosure may be applied to any structure or property feature, including but not limited to, roofs, walls, buildings, awnings, houses, decks, pools, temporary structures such as tents, motor vehicles, foundations, etc.

Figure 1:
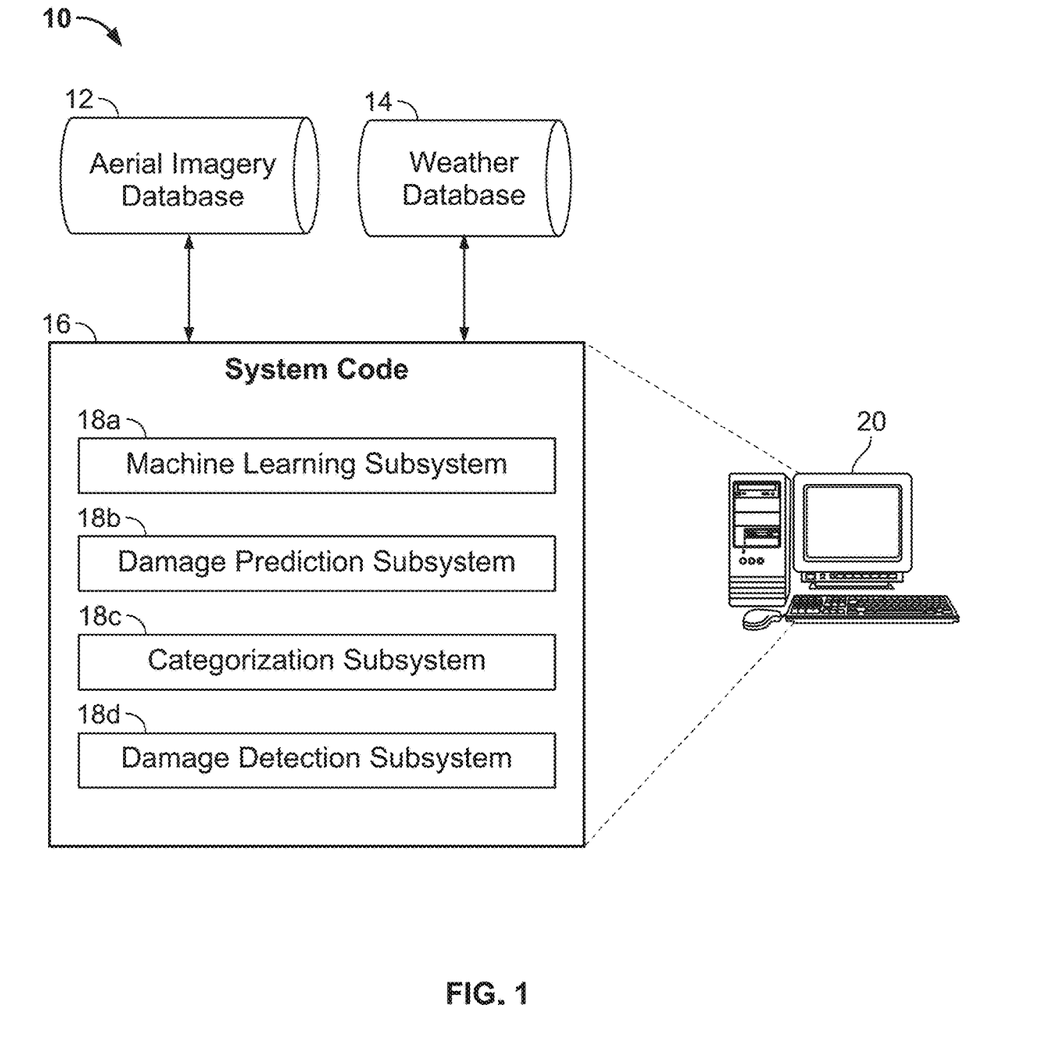
FIG. 1 is a diagram illustrating hardware and software components capable of being utilized to implement the system of the present disclosure.

FIG. 1 is a diagram illustrating hardware and software components capable of being utilized to implement the system 10 of the present disclosure. The system 10 could be implemented using a computer system (processor) 20 coupled to an aerial imagery database 12 and a weather database 14. The processor 20 executes system code 16 which can detect, extract, and categorize structure data from aerial imagery and determine the likelihood of potential property damage due to a weather event for a given region of interest. The processor 20 could include, but is not limited to, a personal computer, a laptop computer, a tablet computer, a smart telephone, a server, and/or a cloud-based computing platform. It is noted that the imagery stored in the aerial imagery database 12 and processed by the systems/methods of the present disclosure could include, but is not limited to, aerial imagery (e.g., acquired from an airplane, an unmanned aerial vehicle (UAV), or any other suitable source) and/or satellite imagery.

The system 10 includes system code 16 (i.e., non-transitory, computer-readable instructions) stored on a computer-readable medium and executable by the processor 20 or one or more computer systems. The code 16 could include various custom-written software modules that carry out the steps/processes discussed herein, and can include, but are not limited to, a machine learning subsystem 18a, a damage prediction subsystem 18b, a categorization subsystem 18c, and a damage detection subsystem 18d. The code 16 can be programmed using any suitable programming languages including, but not limited to, C, C++, C#, Java, Python or any other suitable language. Additionally, system code 16 can be distributed across multiple computer systems in communication with each other over a communications network, and/or stored and executed on a cloud computing platform and remotely accessed by a computer system in communication with the cloud platform. System code 16 can communicate with the aerial imagery database 12 and the weather database 14, which can be stored on the same computer system as system code 16, or on one or more other computer systems in communication with system code 16.

Still further, the system 10 can be embodied as a customized hardware component such as a field-programmable gate array ("FPGA"), application-specific integrated circuit ("ASIC"), embedded system, or other customized hardware component without departing from the spirit or scope of the present disclosure. It should be understood that FIG. 1 is only one potential configuration, and the system 10 of the present disclosure can be implemented using a number of different configurations. Additional configurations are discussed in connection with FIG. 9 hereinbelow.

Figure 2:
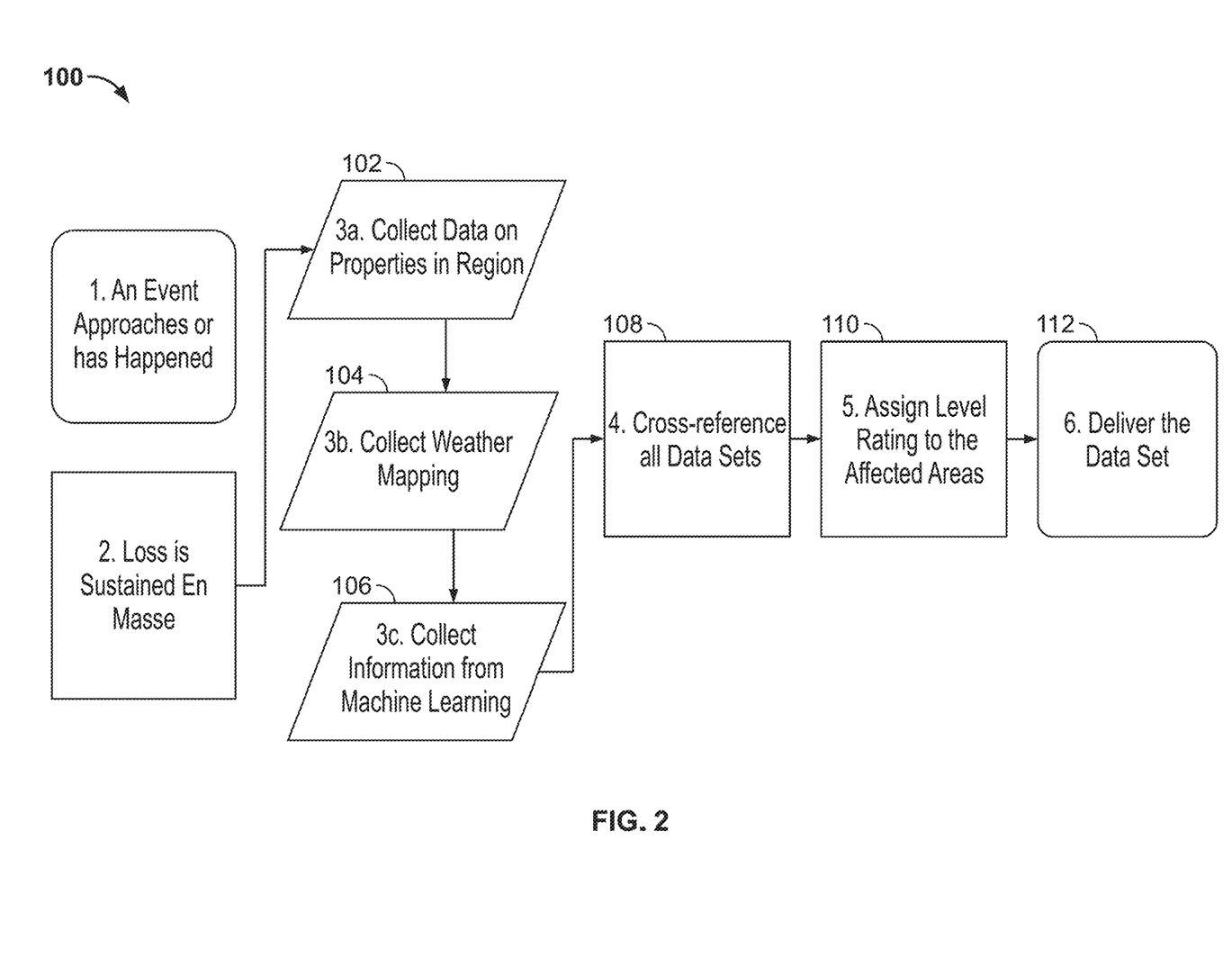
FIG. 2 is a flowchart illustrating overall process steps carried out by the system of FIG. 1.

FIG. 2 is a flowchart illustrating overall process steps 100 carried out by the system 10 of the present disclosure. As shown, the process begins at step 102, after a weather event has occurred and potential property damage has been sustained. In step 102, the system 10 collects (e.g., receives, downloads, etc.) data on properties based on a geospatial region of interest ("ROI") specified by a user. For example, a user can input latitude and longitude coordinates of an ROI. The region can be of interest to the user because of one or more structures present in the region. The geospatial ROI can be represented as a polygon bounded by latitude and longitude coordinates. In a first example, the bound can be a rectangle or any other shape centered on a postal address. In a second example, the bounds can be determined from survey data of property parcel boundaries. In a third example, the bounds can be determined from a selection made by the user (e.g., in a geospatial mapping interface). Those skilled in the art will understand that other methods can be used to determine the bounds of a polygon. The ROI may be represented in any computer format, such as, for example, well-known text ("WKT") data, TeX data, Lamport TeX ("LaTeX") data, HTML data, XML data, etc. According to certain aspects of the present disclosure, the user can provide the system 10 with a list of properties representing one or more ROIs. For example, as discussed in greater detail below, a user can upload a spreadsheet including a plurality of latitude and longitude coordinates, representing a plurality of individual structures or properties within one or more ROIs.

After the user provides the geospatial ROI, aerial images associated with the geospatial ROI can be obtained from the aerial image database 12. As mentioned above, the images can be digital images such as aerial images, satellite images, etc. However, those skilled in the art will understand that any type of images (e.g., photograph, scan, LIDAR, etc.) can be used. It should be understood that multiple images can overlap all or a portion of the geospatial ROI.

In step 104, the system 10 collects weather mapping data for the ROI. The weather mapping data can include data related to hail storms, wind, and hurricanes. The system 10 can collect data related to the maximum hail size at ground level and the probability of severe hail fall from radar data. Maximum wind gusts (e.g., non-hurricane or tornado), estimated from maximum three (3) second peak gusts at 10 meters above the ground, and the length of time the wind speed is above 50 miles per hour, given the number of hours over 24 hours, derived from model, radar, and station observational data. For example, if 4 hours is returned by the system, 28 hours have passed in a given area where the wind speed is 50 mph or higher. For hurricanes, wind is constant, therefore what is collected by the system 10 is the highest average wind gust in an area over the duration of the storm event (e.g., life of storm). The average speed at 10 meters above the ground in the area over the duration of the hurricane event (e.g., maximum sustained wind speed) can be collected as well. Of course, these are only illustrative examples and those of ordinary skill in the art will understand that the system 10 can collect weather mapping data related to various weather systems from a plurality of sources.

In step 106, the system 10 collects information from the machine learning subsystem 18a. The machine learning subsystem 18a can process aerial images (e.g., retrieved from aerial imagery database 12) using machine learning algorithms to automatically determine and extract attributes (e.g., roof type, area, slope, material, eave height, etc.) of one or more structures within the ROI. Various machine learning algorithms will be known to those of skill in the art for determining the attributes of the structures within the ROI, based on aerial images. Examples of suitable machine learning algorithms that could be utilized in connection with the machine learning subsystem 18a include those disclosed in U.S. Patent Application Publication No. 2019/0188516A1, the entire disclosure of which is expressly incorporated herein by reference. Of course, other suitable machine learning algorithms could be used without departing from the spirit or scope of the present disclosure. The image sources could include but are not limited to, aerial imagery, satellite imagery, or UAV imagery.

In step 108, the system 10 cross-references the data collected in steps 102-106 to automatically predict the likelihood that property damage has been sustained from the weather event. For example, the system 10 can generate a spreadsheet, table, database, or the like (see, e.g., FIG. 5) that includes a list of properties and weather information, property machine learning attributes (e.g., roof type, area, slope, material, eave height, etc.), and a likelihood of property damage associated with each property or structure within a given region of interest.

In step 110, the system 10 assigns a risk rating level to affected properties within the ROI. More specifically, the risk rating level is correlated to the likelihood of damage to an individual property within the ROI. As discussed in greater detail below, the individual risk level ratings can be filtered and sorted to fit various criteria specified by the user. According to some aspects of the present disclosure, the system 10 can assign categories (e.g., category 1, 2, 3, 4, 5, etc.) to each property within the ROI. According to one example, if a user uploads a list of 1,000 locations, or properties, to the system 10, each of the 1,000 locations can be assigned a category, based on criteria defined by the user. As such, category 1 can be representative of the most severe damage and category 5 can be representative of areas that are unaffected by a weather event. Of course, those of ordinary skill in the art will understand that any number of categories can be utilized by the system 10, as desired by the user.

Finally, in step 112, the system 10 delivers a data package to the user. For example, as discussed above, the data package can include a spreadsheet, table, database or the like and can include weather information, aerial imagery of the ROI, property attributes (e.g., roof type, area, slope, material, eave height, etc.), and a likelihood of property damage associated with each property or structure within a given region of interest. The data package can also include a visualization of this information, as will be discussed in connection with FIGS. 6-8.

The user can utilize the information contained within the data package to identify properties within the ROI that require additional analysis, or further attention. The user can identify these properties based on the various criteria specified by the user. For example, if a category one (1) property is identified within a given ROI, the user can access post-catastrophe aerial imagery for the property. According to additional aspects of the present disclosure, the user can request post-catastrophe damage detection for the property. When the system 10 receives a request for post-catastrophe damage detection, the system 10 can process the post-catastrophe aerial imagery associated with the property, using the damage detection subsystem 18d (see FIG. 1), to precisely determine the extent of the damage to the specific property. The system 10 can then deliver the results of the post-catastrophe damage detection to the user using the graphical interface described below or any other means of data transmission and delivery known to the art.

Figure 3:
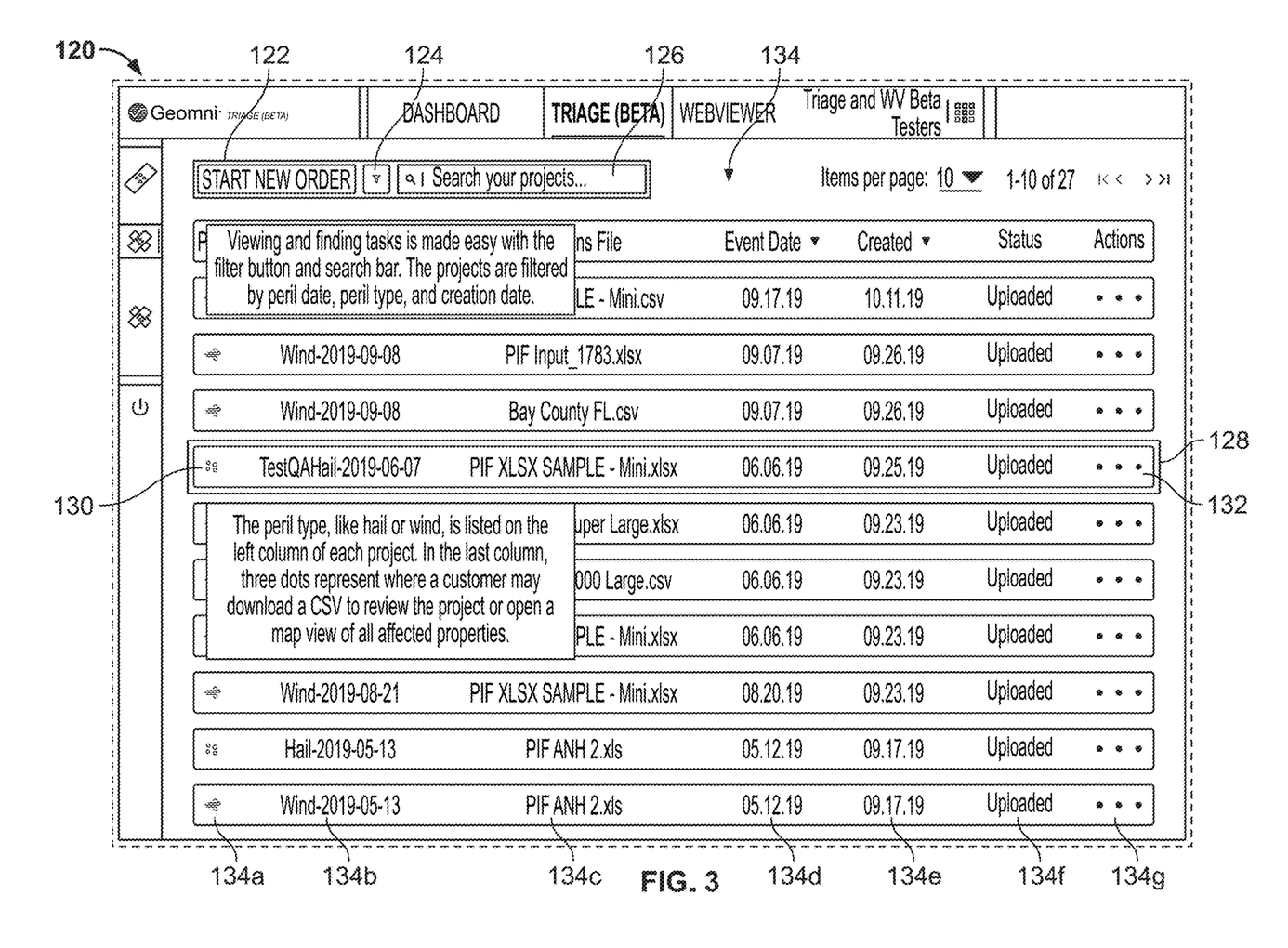
FIG. 3 is a user interface screen generated by the system of FIG. 1 for viewing, managing, and requesting new projects.

FIG. 3 illustrates a graphical user interface screen 120 generated by the system 10 of the present disclosure, through which a user can view and manage existing data packages (e.g., data package 128) and request new projects. As shown, the user interface screen 120 can include a plurality of columns 134. For example user interface screen 120 can include column 134a including a graphical depiction 130 of the weather event (e.g., hail, wind, rain, snow, etc.) associated with a particular project/data package, column 134b including the name of a particular project, column 134c including the name of the data file (e.g., .xls, .csv, etc.) associated with the ROI, column 134d including the date of the weather event or the date the project was created, column 134f showing the status of the project, and column 134g including a button 132 allowing the user to download a data package to review the project, or to open a map view of all affected properties, discussed in greater detail below. User interface screen can also include a button 122 that allows the user to start a new project, a filter button 124 for sorting the projects based on, for example, the date of the weather event, the type of weather event, and the date the project was created, and a search bar 126.

Figure 4:
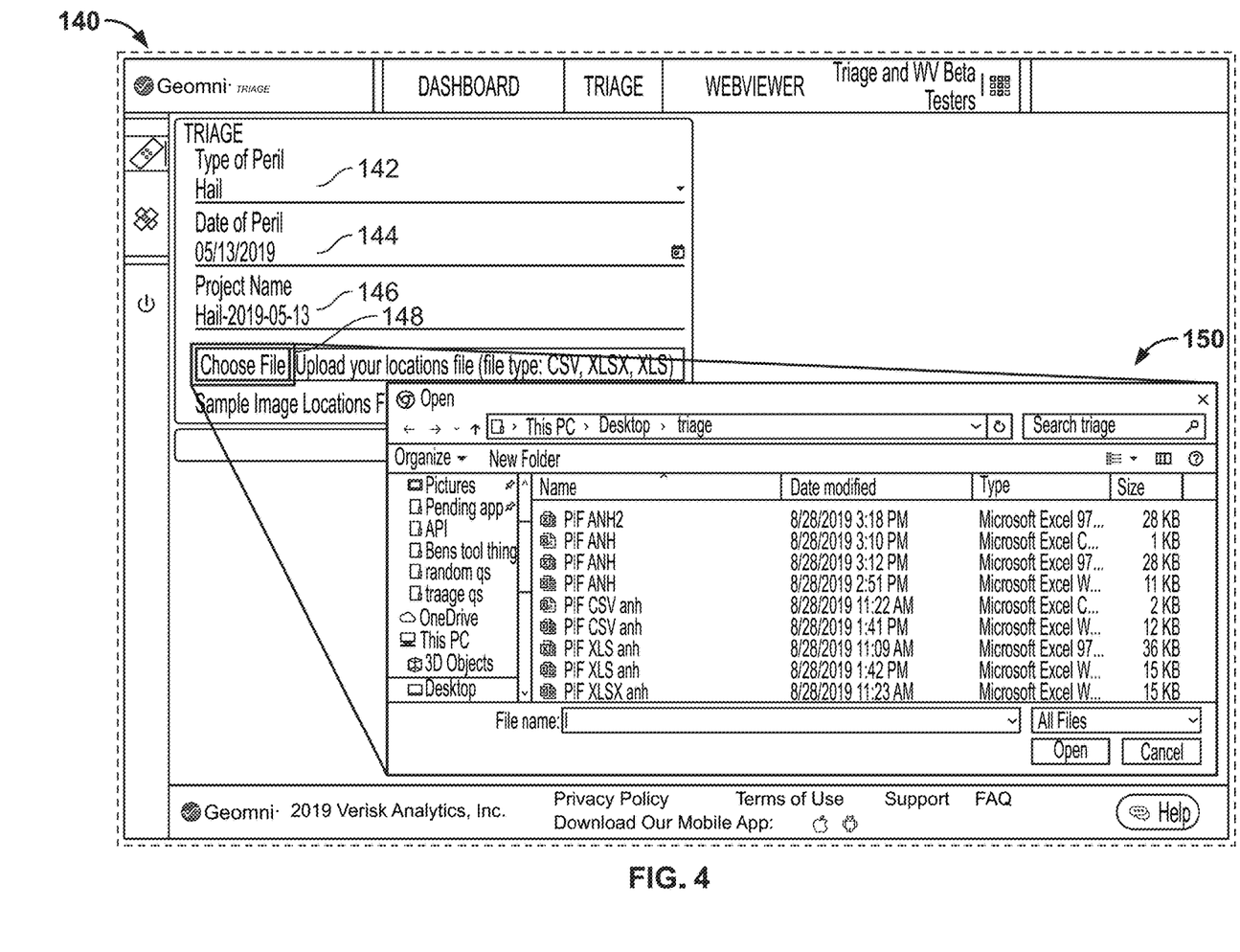
FIG. 4 is a user interface screen generated by the system of FIG. 1 for creating a new project.

FIG. 4 illustrates a graphical user interface screen 140 generated by the system 10 of the present disclosure for creating a new project. For example, the system 10 can generate user interface screen 14 when the user clicks on button 122, discussed in connection with FIG. 3. As shown in FIG. 4, user interface screen 140 can include a field 142 where the user can select the type of weather event (e.g., from a dropdown list), a field 144 where the user can specify the date of the weather event, a field 146 where the user can specify the name of the project, and a button 148, which allows the user to upload a data file to the system 10, specifying the ROI. For example, when the user clicks on button 148, the system 10 can generate user interface window 150, where the user can select a file associated with the ROI for upload to the system 10.

Figure 5:
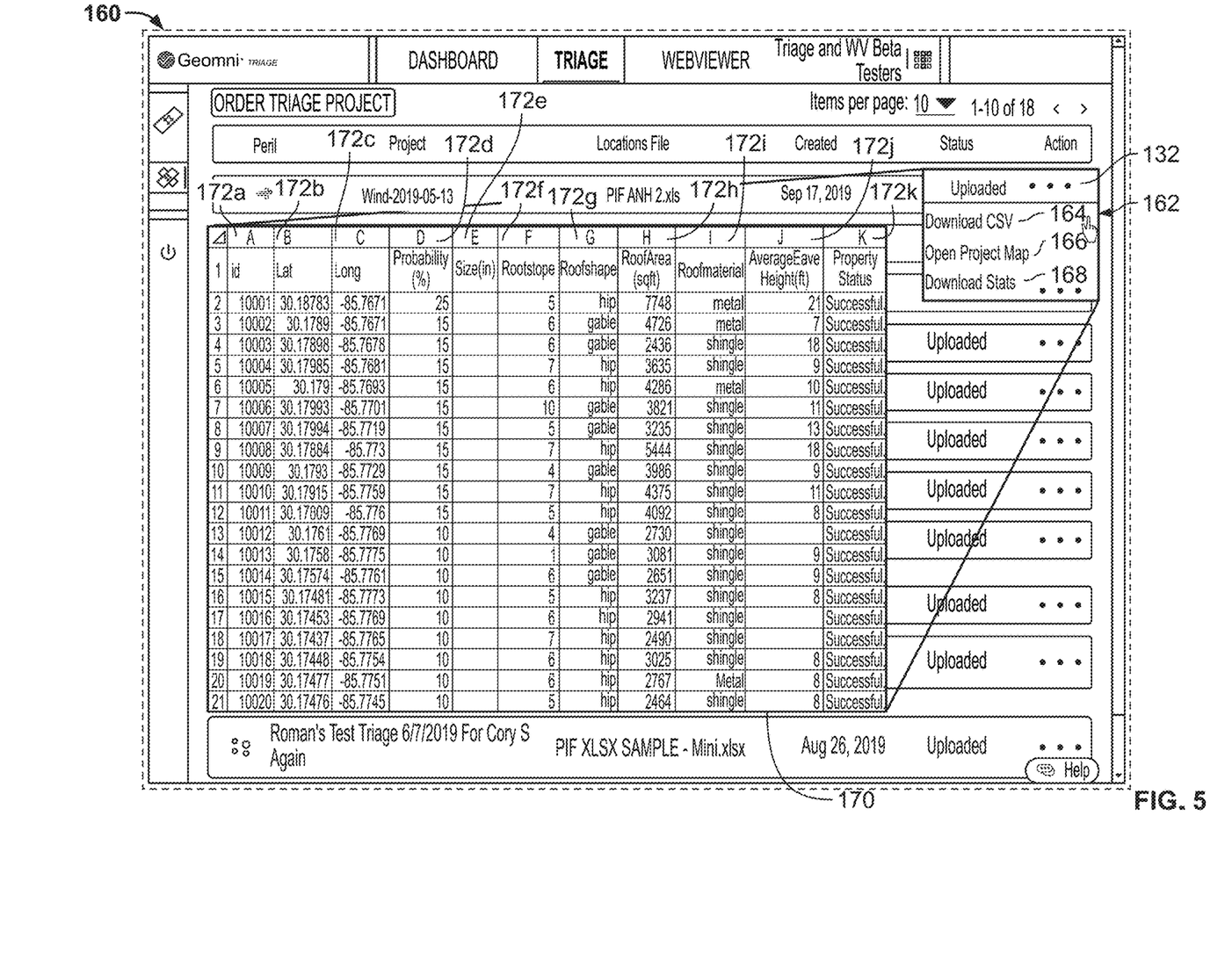
FIG. 5 is a user interface screen showing a data package generated by the system of FIG. 1.

FIG. 5 illustrates graphical user interface screen 160 generated by the system 10 of the present disclosure. More specifically system 10 can generate user interface screen 160 when a user clicks on button 132, discussed in connection with FIG. 3. As shown in FIG. 5, clicking on button 132 can cause the system 10 to display a list of actions 162 (e.g., a dropdown menu) that can be selected by the user. For example, the system can display a first button 164 for downloading a data package associated with a project, a second button 166, allowing the user to view a map of the ROI, and a third button 168 for downloading additional statistics associated with the project. As shown, clicking on button 164 can cause the system 10 to display a data package 170 associated with the project. The data package 170 can be a table (e.g., .xls or .csv file) including a plurality of columns 172. For example, data package 170 can include: column 172a including an identification number of a property within the ROI; column 172b including the longitude coordinate of the property; column 172c including the latitude coordinate of the property; column 172d including a probability of damage (e.g., 5%, 10%, 15%, 20%, etc.) to the property caused by the weather event; column 172e including the size (e.g., inches) of a roof of the property; column 172f including the slope (e.g., 1, 2, 3, 4, 5, 6, 7, 8, 9, 10, etc.) of the roof; column 172g including the shape (e.g., hip, gable, etc.) of the roof; column 172h including the area (e.g., square feet)

of the roof; column 172*i* including the material (e.g., metal, shingle, tile, etc.) of the roof; column 172*j* including the average eave height (e.g., feet) of the roof; and column 172*k* including the status of the of the analysis of the property within the ROI by the system 10. As discussed above, the user can upload a spreadsheet with a list of properties within the ROI (e.g., columns 172*a*-172*c*) and the system 10 can automatically attach weather information and property machine learning attributes, like the roof type, area, slope, material, and eave height (e.g., columns 172*d*-172*k*) to the spreadsheet and return the data package 170 to the user with the new attributes attached, as shown in FIG. 5.

Figure 6:
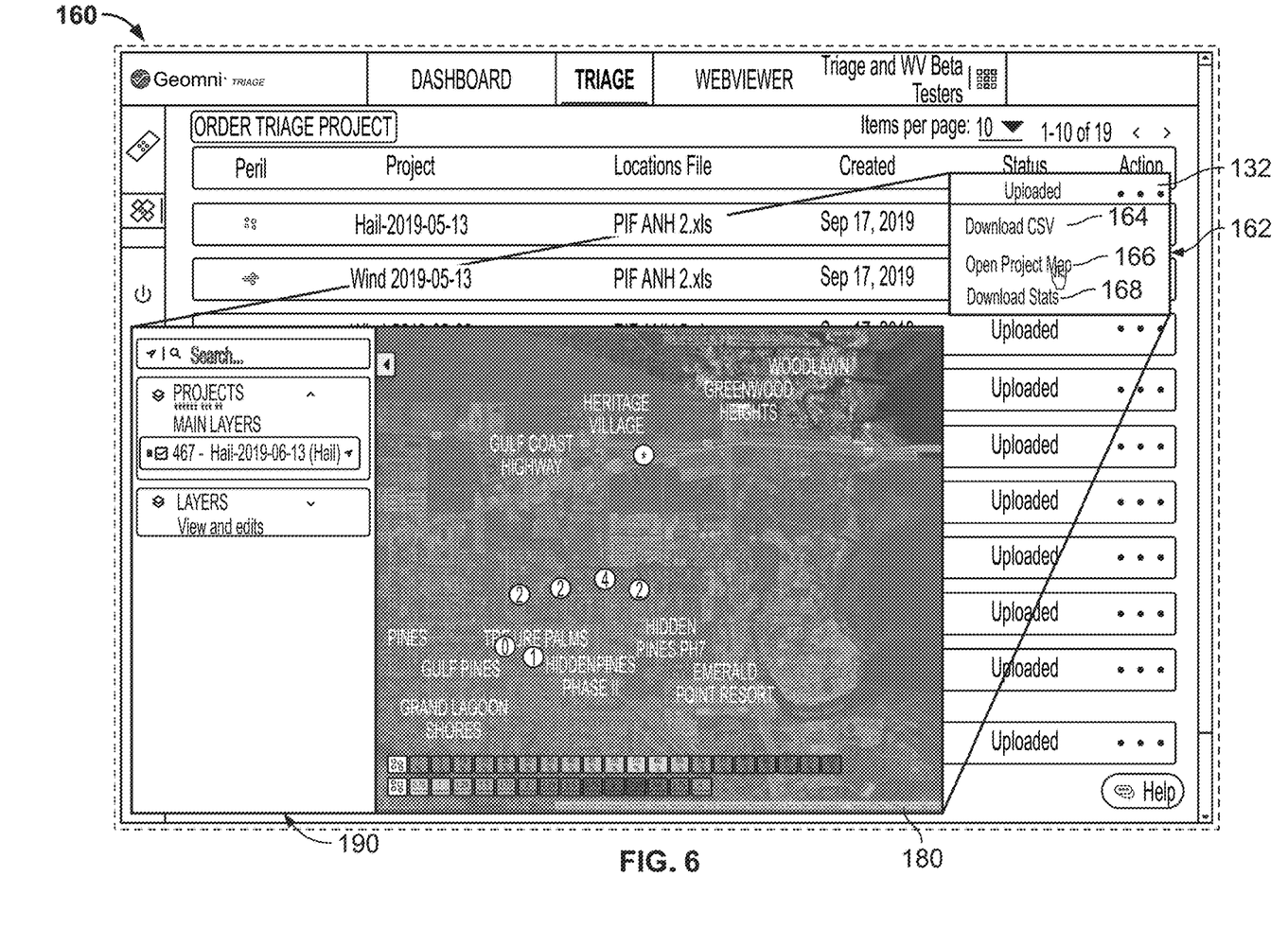
FIG. 6 is a user interface screen showing a project map generated by the system of FIG. 1.

FIG. 6 illustrates the graphical user interface screen 160 generated by the system 10 of the present disclosure when a user selects button 132 and further selects the project map button 166 from the action list 162. As shown in FIG. 6, when the user selects the project map button 166, the system 10 can generate a user interface screen 190 including a project map 180 showing the ROI and allowing the user to compare property points to weather data for the date of the weather event. User interface screen 190 is discussed in greater detail in connection with FIGS. 7A, 7B, and 8.

Figure 7A:
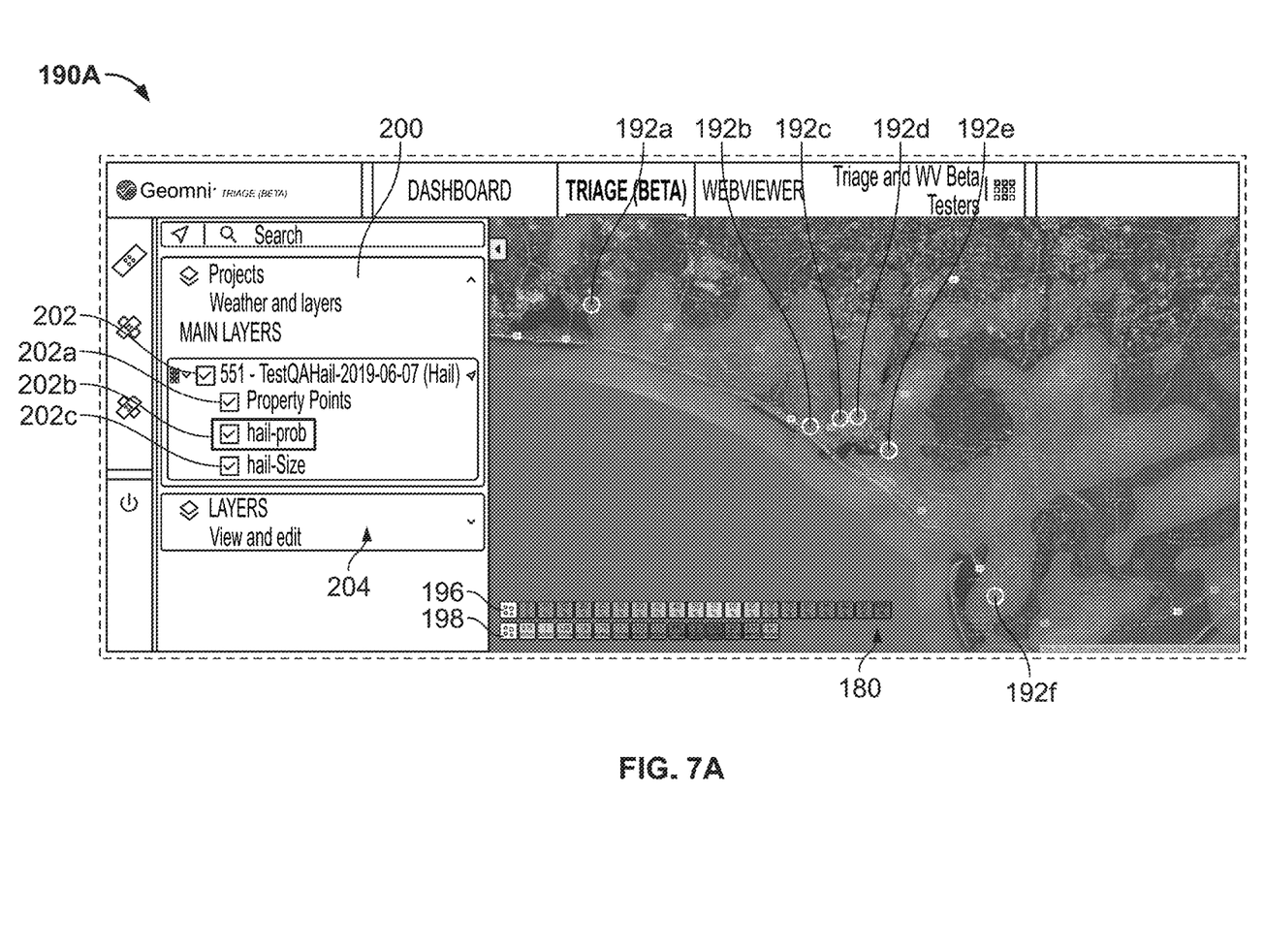
FIG. 7A is a user interface screen illustrating additional aspects of the project map of FIG. 6.

FIG. 7A illustrates graphical user interface screen 190A generated by the system 10 of the present disclosure. User interface screen 190A is a visual breakdown of the data generated by the system 10 and can be displayed using a web-based interface, or dedicated application and provides an overlay showing the weather linked with a statistical potential for damage, broken down by severity and the geographical locations from the property list. This graphical user interface makes viewing the ROI and property easy to understand for the user.

Figure 7B:
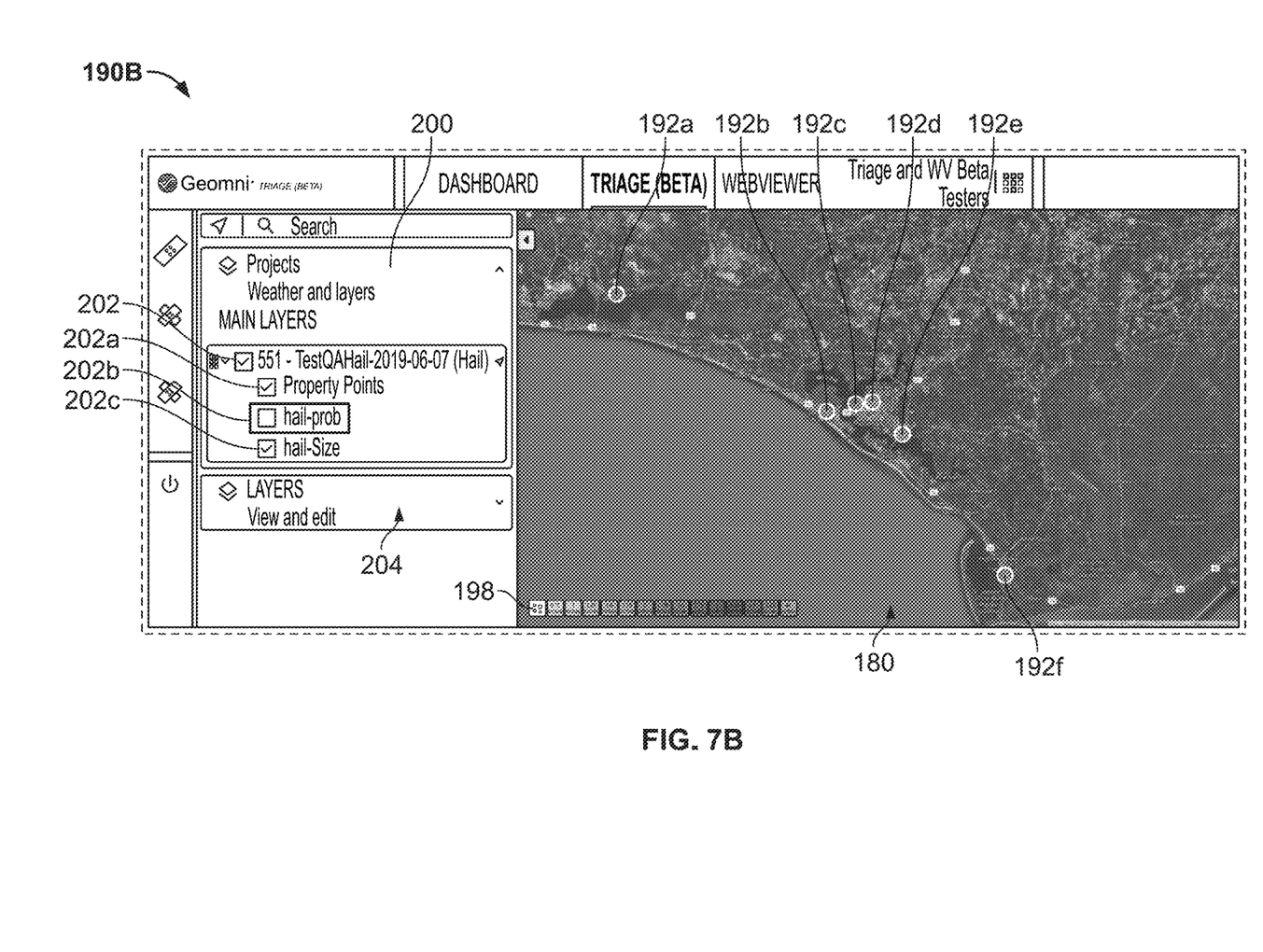
FIG. 7B is a user interface screen illustrating additional aspects of the project map of FIG. 6.

As shown in FIG. 7A, the user interface screen 190A can include a project map 180 showing the ROI and properties 192*a*, 192*b*, 192*c*, 192*d*, 192*e*, and 192*f* therein, a projects section 200 for selecting one or more projects, and a layers section 204. The projects section can also include one or more buttons 202*a*-202*c* for enabling/disabling layers on the project map 180, which visually convey information to the user. The layers are designed to toggle on or off to provide the most detailed view possible for the user, thereby allowing the user to compare different weather layers to property points more effectively. For example, button 202*a* can be used to toggle the display of the property points 192*a*, 192*b*, 192*c*, 192*d*, 192*e*, and 192*f* within the ROI on or off, button 202*b* can be used to toggle the display of a hail probability map overlay 194 on or off, and button 202*c* can be used to toggle the display of a hail size overlay on or off. Button 202 can be used to toggle all of buttons 202*a*-*c* on or off. For example, as shown in FIG. 7B, by toggling button 202*b* off, the system 10 removes the hail probability overlay map 194 from the project map 180. Additionally, the project map 180 can also include a map key 196 associated with the hail probability map overlay 194 and a map key 198 associated with the hail size overlay. As will be understood by those of ordinary skill in the art, map keys 196 and 198 can provide the user with additional information related to the overlays (e.g., hail probability overlay map 194) displayed on the project map 180. Toggling one or more of buttons 202*a*-*c* on or off can also cause the system 10 to remove an associated overlay. For example, as shown in FIG. 7B, by toggling button 202*b* off, the system 10 can remove the map key 196, in addition to removing the hail probability map overlay 194 from the project map 180.

Figure 8:
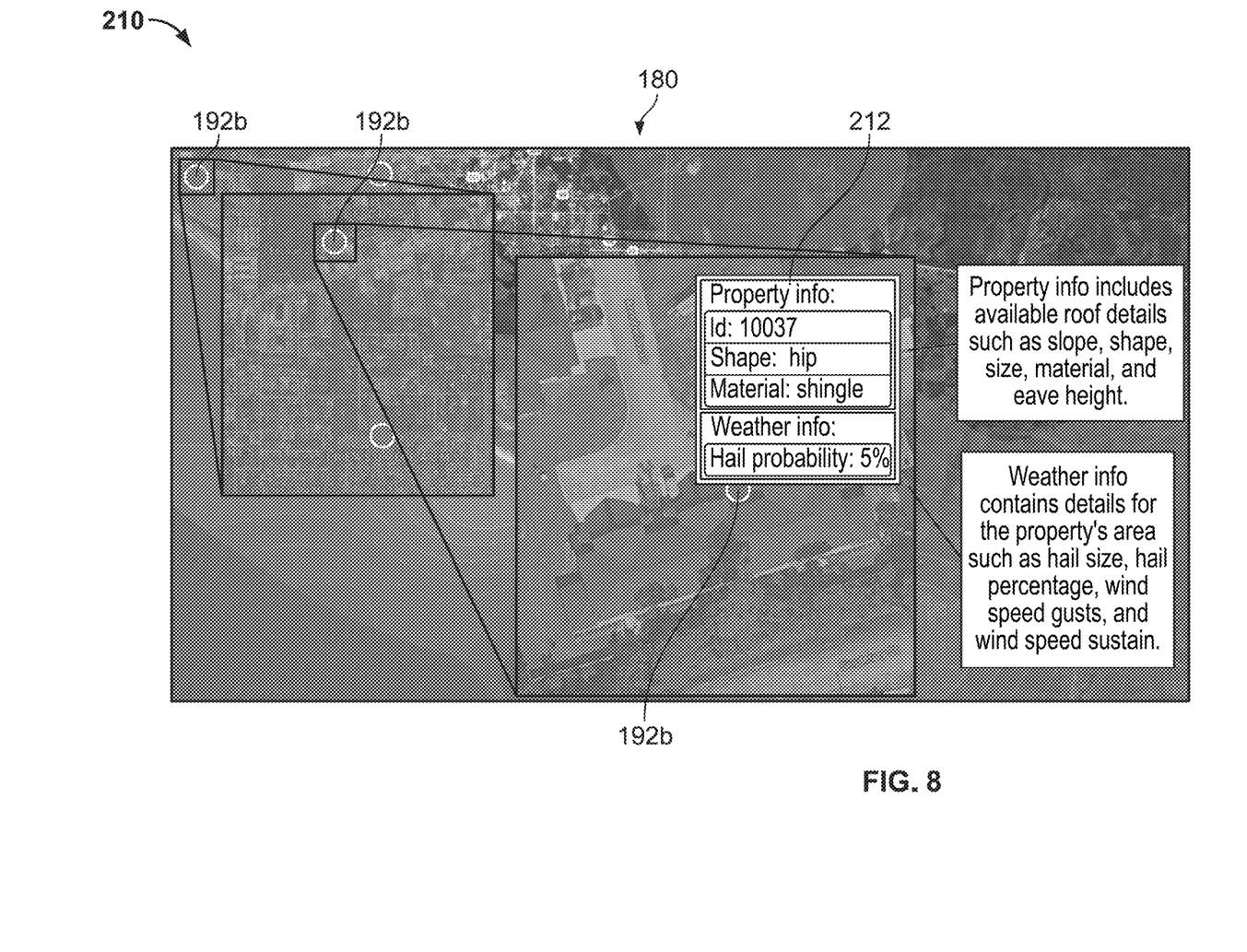
FIG. 8 is a user interface screen illustrating additional aspects of the project map of FIG. 6.

FIG. 8 illustrates graphical user interface screen 210 generated by the system 10 of the present disclosure allowing the user to adjust magnification of the project map 180. For example, the user can zoom out on the project map 180 to view an overview of an entire storm system or zoom in to individual structures. As shown, the user can zoom in on an individual property (e.g., point 192*b*). Additionally, selecting a property point property point can cause the system 10 to display a property information window 212, including for example, property identification number and available roof details such as slope, shape, size, material, and eave height. The property information window 212 can also include information related to the weather event such as, for example, hail size hail percentage, wind speed gusts, and sustained wind speeds.

Figure 9:
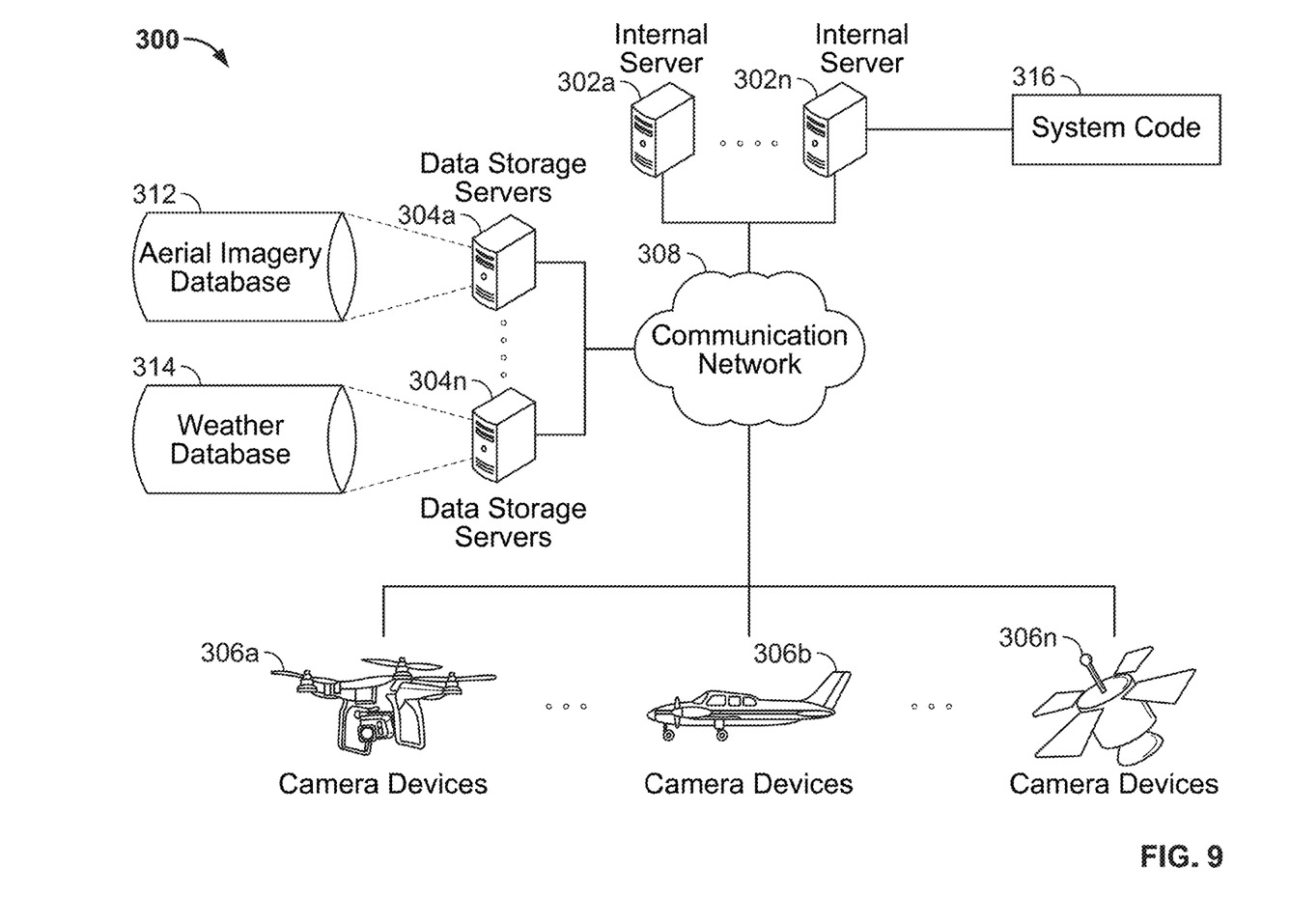
FIG. 9 is a diagram illustrating additional aspects of the system of the present disclosure.

FIG. 9 is a diagram illustrating system 300 of the present disclosure. In particular, FIG. 9 illustrates computer hardware and network components on which the system 300 can be implemented. The system 300 can include a plurality of internal servers 302*a*-302*n* having at least one processor and memory for executing the computer instructions and methods described above (which could be embodied as system code 316, similar to system code 16, described herein). The system 300 can also include a plurality of storage servers 304*a*-304*n* for receiving and storing aerial imagery and weather data. For example, according to some aspects of the present disclosure, an aerial imagery database 312 and a weather database 314 can be stored on servers 304*a*-304*n*. The system 300 can also include a plurality of devices 306*a*-306*n* equipped with systems for capturing aerial imagery and weather data. For example, the camera devices can include, but are not limited to, a unmanned aerial vehicle 306*a*, an airplane 306*b*, and a satellite 306*n*. The internal servers 302*a*-302*n*, the storage servers 304*a*-304*n*, and the camera devices 306*a*-306*n* can communicate over a communication network 308 (e.g., the Internet). Of course, the system 300 need not be implemented on multiple devices, and indeed, the system 200 could be implemented on a single computer system (e.g., a personal computer, server, mobile computer, smart phone, etc.) without departing from the spirit or scope of the present disclosure.

According to further aspects of the present disclosure, the systems and methods described herein can be implemented as a background service, thereby allowing other computing systems (e.g., Guidewire and XactAnalysis) to utilize the systems of the present disclosure (e.g, systems 10 and 300) as a "decision-making engine." Furthermore, the systems of the present disclosure can include an application programming interface ("API") that can provide communication between the systems of the present disclosure and the other computer systems. For example, this engine can allow other computer systems to submit their own property lists and weather events, and once a user defines parameters for the categories as described above, the system can automatically export the resulting data package to the other computing systems.

It is noted that the systems/methods of the present disclosure could be utilized to detect, extract, and categorize structure data arising from a wide variety of events (both weather-related and non-weather-related), such as wildfires, lightning, arson, hurricanes, hailstorms, tornadoes, etc. Still further, the system can detect, extract, and categorize structure data at a broader level, such as severity of damage (e.g., "Category 1" could represent damage that is most sever, and "Category 5" could represent areas that are unaffected by damage, and/or other measures/scales could be used such as the likelihood of damage to properties or structures within a given region of interest, etc.). Additionally, the systems/methods disclosed herein could process a wide variety of detection attributes, such as missing roof material, missing roof sheeting, exposed roof trusses/rafters, detected tarps, etc.). Of course, other attributes could be detected and processed by the system.

Having thus described the system and method in detail, it is to be understood that the foregoing description is not intended to limit the spirit or scope thereof. It will be understood that the embodiments of the present disclosure described herein are merely exemplary and that a person skilled in the art can make any variations and modification without departing from the spirit and scope of the disclosure. All such variations and modifications, including those discussed above, are intended to be included within the scope of the disclosure. What is desired to be protected by Letters Patent is set forth in the following claims.

What is claimed is:

1. A method for predicting damage to a structure, comprising:
   receiving at a computer system an indication of a geospatial region of interest from a user;
   retrieving by the computer system one or more aerial images associated with the region of interest from an aerial image database;
   processing the one or more aerial images using a machine learning algorithm executed by the computer system to extract one or more attributes of a structure within the region of interest;
   retrieving by the computer system weather data associated with the region of interest from a weather database;
   determining by the computer system a likelihood of damage to the structure based on the one or more extracted attributes and the weather data associated with the region of interest;
   transmitting a data package from the computer system which includes the likelihood of damage to the structure; and
   displaying a project map which includes a plurality of user-selectable display layers that can be toggled on and off, wherein at least one of the user-selectable display layers includes a graphical depiction of a weather event overlaid on the property.

2. The method of claim 1, wherein geospatial region of interest is indicated by latitude and longitude coordinates.

3. The method of claim 1, wherein the geospatial region of interest is indicated by a bounded polygon displayed on a computer display.

4. The method of claim 3, wherein the bounded polygon is determined by one or more of a postal address, property survey data, or a selection made by a user in a geospatial mapping interface.

5. The method of claim 1, wherein the one or more aerial images comprises one or more of a satellite image, an image captured by an unmanned aerial vehicle (UAV), a photographic aerial image, a scanned image, or a LIDAR image.

6. The method of claim 1, wherein the weather data includes data relating to one or more of hail storms, wind, and hurricanes.

7. The method of claim 1, wherein the machine learning algorithm extracts attributes relating to a roof of a structure including one or more of a roof type, a roof area, a slope, a roof material, or an eave height.

8. The method of claim 1, further comprising calculating by the computer system a risk rating level correlated to the likelihood of damage and including the risk rating level in the data package.

9. The method of claim 1, further comprising processing the data package to generate a visualization of damage and displaying the visualization to a user.

10. The method of claim 1, further comprising detecting, extracting, and categorizing structure data from one or more of a wildfire, lightning, arson, hurricanes, hailstorms, tornadoes, and non-weather-related data.

11. A system for predicting damage to a structure, comprising:
   a memory storing one or more aerial images; and
   a processor in communication with the memory, the processor:
      receiving an indication of a geospatial region of interest from a user;
      retrieving one or more aerial images associated with the region of interest from the memory;
      processing the one or more aerial images using a machine learning algorithm to extract one or more attributes of a structure within the region of interest;
      retrieving weather data associated with the region of interest from a weather database;
      determining a likelihood of damage to the structure based on the one or more extracted attributes and the weather data associated with the region of interest; and
      transmitting a data package which includes the likelihood of damage to the structure; and
      displaying a project map which includes a plurality of user-selectable display layers that can be toggled on and off, wherein at least one of the user-selectable display layers includes a graphical depiction of a weather event overlaid on the property.

12. The system of claim 11, wherein geospatial region of interest is indicated by latitude and longitude coordinates.

13. The system of claim 11, wherein the geospatial region of interest is indicated by a bounded polygon displayed on a computer display.

14. The system of claim 13, wherein the bounded polygon is determined by one or more of a postal address, property survey data, or a selection made by a user in a geospatial mapping interface.

15. The system of claim 11, wherein the one or more aerial images comprises one or more of a satellite image, an image captured by an unmanned aerial vehicle (UAV), a photographic aerial image, a scanned image, or a LIDAR image.

16. The system of claim 11, wherein the weather data includes data relating to one or more of hail storms, wind, and hurricanes.

17. The system of claim 11, wherein the machine learning algorithm extracts attributes relating to a roof of a structure including one or more of a roof type, a roof area, a slope, a roof material, or an eave height.

18. The system of claim 11, wherein the processor calculates a risk rating level correlated to the likelihood of damage and includes the risk rating level in the data package.

19. The system of claim 11, wherein the processor detects, extracts, and categorizes structure data from one or more of a wildfire, lightning, arson, hurricanes, hailstorms, tornadoes, and non-weather-related data.

* * * * *